United States Patent
Luo et al.

[11] Patent Number: 6,143,173
[45] Date of Patent: Nov. 7, 2000

[54] REMOVABLE DRAIN FILTER

[76] Inventors: Dan Luo, 2108 S. Princeton Apt#408, Chicago, Ill. 60616; Yan-Yan Liu, Apt #601 Building 15 Hai-Xia Xinchun, Zhuhai, Guangdong, China

[21] Appl. No.: 09/365,452
[22] Filed: Aug. 2, 1999
[51] Int. Cl.[7] .................................................. B01D 36/04
[52] U.S. Cl. .............................. 210/305; 210/311; 210/94
[58] Field of Search ..................................... 210/305, 299, 210/300, 437, 94, 311

[56] References Cited

U.S. PATENT DOCUMENTS

| | | |
|---|---|---|
| 965,836 | 7/1910 | Ray . |
| 1,655,191 | 1/1928 | Linnmann, Jr. . |
| 1,851,172 | 3/1932 | Gordon . |
| 2,059,844 | 11/1936 | Boosey . |
| 2,099,061 | 11/1937 | Gordon . |
| 4,396,508 | 8/1983 | Broughton . |
| 4,472,277 | 9/1984 | Bailey et al. . |
| 5,405,538 | 4/1995 | Batten . |
| 5,637,234 | 6/1997 | McCasland . |
| 5,861,098 | 1/1999 | Morrison . |

OTHER PUBLICATIONS

"Solus Separator"C 1931. Pp. 1–23. The Central Foundry Company.

*Primary Examiner*—Thomas M. Lithgow

[57] ABSTRACT

The present invention provides an economical and efficient means for removing grease and other contaminants from restaurant wastewater. There is a need for an easily removable drain filter. The present invention meets this need, as it is a low-cost, disposable, and efficient means for removing these contaminants.

10 Claims, 1 Drawing Sheet

REMOVABLE DRAIN FILTER

FIELD OF THE INVENTION

This invention relates to wastewater filtration products, more particularly to a removable drain filter for use in a restaurant. The filter is used to separate grease and other waste materials from the wastewater stream in a restaurant.

DESCRIPTION OF THE PRIOR ART

Filtration systems to separate grease from the wastewater stream before discharge to the sanitary sewer have long been the norm in restaurants. These systems can reduce the amount of grease discharged to acceptable levels. When these filtration devices filled with grease, the process of emptying them was expensive and time-consuming. The process caused restaurant shut-downs due to the odor, resulting in lost business.

U.S. Pat. No. 4,396,508 to Broughton discloses a separator for multi-phase liquids. This separator can be used to separate grease and oil from water. U.S. Pat. No. 5,405,538 to Batten discloses an immiscible liquids separator. This apparatus can be used to remove grease from a grease trap containing grease and water. U.S. Pat. No. 5,637,234 to McCasland discloses an apparatus and method for separating fluids having different specific gravities. This apparatus and method could be used to separate a mixture of fluids such as oil and water. U.S. Pat. No. 5,861,098 to Morrison discloses an apparatus and method for removing grease from drain water in restaurant operations. This apparatus and method uses the different specific gravities to remove fats, oils, and grease from a wastewater stream.

BRIEF SUMMARY OF THE INVENTION

The ideal discharge of wastewater to the sanitary sewer system contains a very low concentration of grease and oil and other food particles. The typical discharge from a restaurant contains high concentrations of grease and oil and other food particles that must be removed before discharging the wastewater to the sanitary system. The object of this invention is to provide an efficient and economic means to accomplish this task.

The foregoing object of the present invention is accomplished by a low-cost filtration system that is placed before the restaurant's discharge to the sanitary sewer. The filter is easily disconnected and disposed of after filling with grease, and is also easily replaced with little disruption. The present invention can be used in conjunction with existing grease traps and separators to help the entire system to function more efficiently. The invention can be made of inexpensive materials, such as plastic, which can be disposed of along with the food and grease.

REFERENCE NUMERALS USED IN THE DRAWINGS

Figure 1:
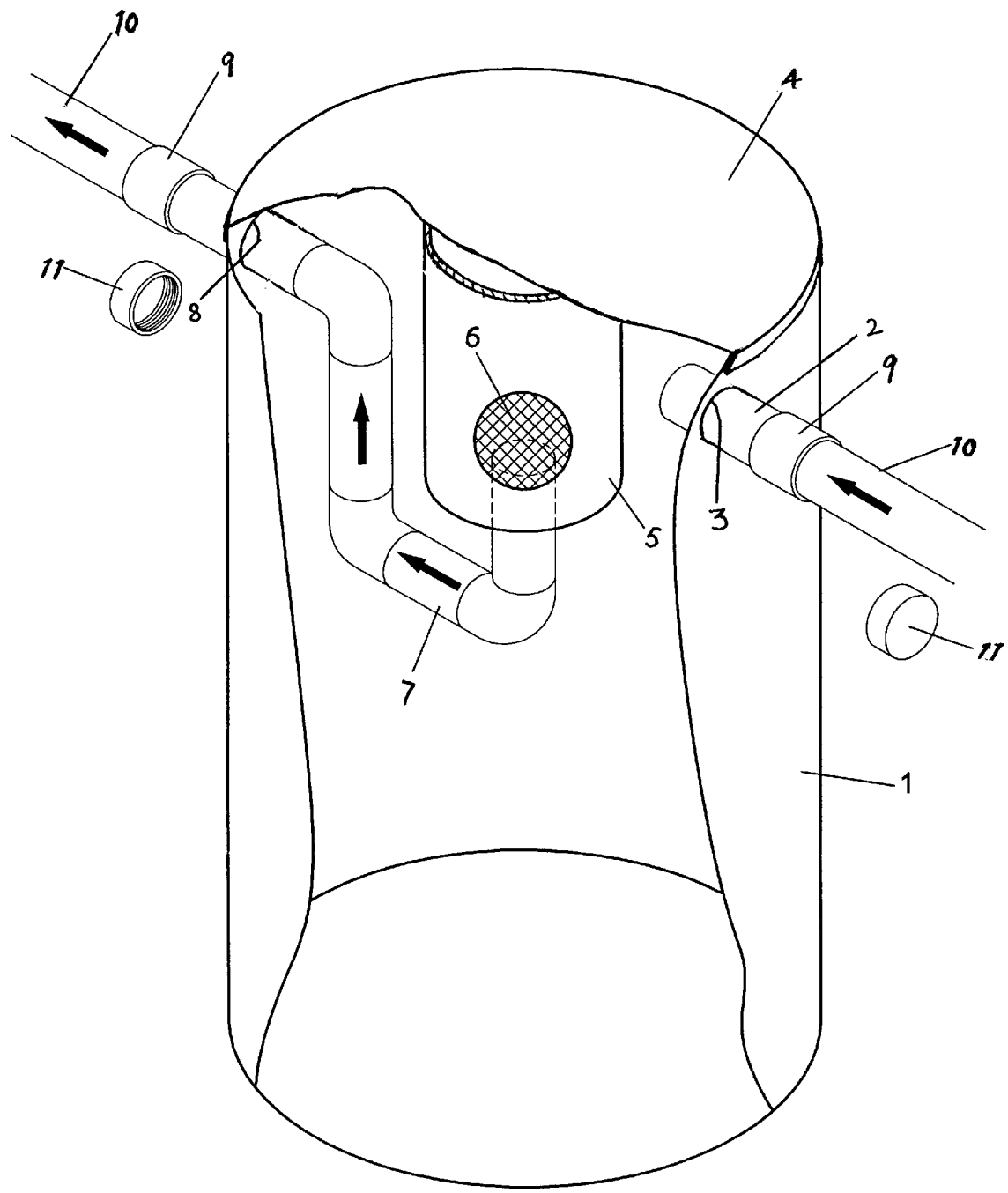
FIG. 1 is a perspective view of the invention.

| | |
|---|---|
| 1 | closed separator tank (outer chamber) |
| 2 | wastewater inlet pipe |
| 3 | wastewater inlet opening |
| 4 | top covering of separator tank (lid) |
| 5 | baffling means (inner chamber) |
| 6 | filtering means |

-continued

REFERENCE NUMERALS USED IN THE DRAWINGS

| | |
|---|---|
| 7 | wastewater outlet pipe |
| 8 | wastewater outlet opening |

DETAILED DESCRIPTION OF THE PREFERRED EMBODIMENT

The invention is used to separate the accumulated waste in a wastewater stream from the water portion of the stream. The wastewater stream enters an outer chamber 1 through an inlet pipe 2, where the materials with a specific gravity greater than water will fall to the bottom of the chamber 1 and accumulate there. The stream then enters a baffle 5 which defines an inner chamber where separates grease and other materials having a specific gravity less than water from the stream. The stream then proceeds through a filter 6 which separates materials having a specific gravity about the same as water from the remainder of the stream which then exits the chamber.

The basic embodiment of the present invention is shown in FIG. 1. The invention consists of a separator tank 1 for the accumulation of waste that is closed at both ends. There are two openings 3,8 in the sides of the tank 1 near the top located opposite one another. To one opening 3 is affixed an inlet pipe 2 as a means of ingress of the flow of wastewater into the tank 1. To the other opening 8 is affixed a similar pipe 7 as a means of egress of the flow of wastewater from the tank 1. Said pipe 7 is attached to the inside of said tank 1 and bends in a U-shape. At the opposite end of the U-shape is affixed a filtering means 6. Said filtering means 6 covers the entire opening of the pipe 7. Surrounding the opening of said pipe 7 and said filtering means 6 is a larger pipe that defines an inner chamber 5 that is open at the bottom and affixed to the top lid 4 of the tank 1. Said inner chamber 5 acts as a baffle. The top lid 4 must be water-proof so as to prevent water and waste from escaping the outer chamber 1, but may be either removable or permanently affixed to the outer chamber 1.

The basic steps of the present invention are shown in accompanying FIG. 1. The arrows indicate the direction of the flow of the wastewater in the filter. In this regard, the contaminated wastewater containing grease and oil as well as other contaminants enters the filter system where the materials with a density greater than water will fall and accumulate on the bottom of the container. Lighter waste material, such as grease, will rise to the surface. The stream then enters the baffle 5 which keeps the grease that is on the surface of the water from entering. The stream then flows through a filter 6, which separates other materials from the water stream that have a density similar to that of water.

The entire apparatus can be made of plastic, a very cheap material. The overall cost of construction of this device, as well as the convenience of removal and disposal of the container make the invention a vast improvement over the prior art. Disconnection and disposal of the invention allows restaurant operators to quickly replace the filter, without having to come in contact with the waste materials. As illustrated in the FIGURE, suitable couplings 9 may be provided for connecting and disconnecting the inlet and outlet pipes 2, 7 to external pipes 10 of a system with which the invention may be used. Caps 11 may also be provided for closing the inlet and outlet pipes 2, 7 when they are disconnected from the system external pipes 10 to allow disposal of the invention without leakage out the inlet and outlet pipes 2, 7.

Most restaurant kitchens currently use a large, metal device to separate grease and other contaminants. These devices must be periodically emptied. This is a very expensive procedure that results in down-time for the restaurant because of the mess and odor during the process. The present invention solves this problem by being very easily replaced by simply detaching the inlet 2 and outlet 7 pipes and installing a new removable drain filter. Threaded couplings can be located at the inlet 3 and outlet 8 openings to allow for easy removal of the apparatus. The closed top 4 as well as the outer chamber 1 can also be transparent to allow for visual inspection for the proper time to replace the device.

What is claimed is:

1. A replaceable apparatus for removing grease and other contaminants from a wastewater stream, comprising:

an outer chamber for the accumulation of waste;

a lid on said outer chamber that is watertight to prevent the waste from escaping from said outer chamber;

an inlet pipe through said outer chamber having an outlet end within said outer chamber for the inflow of wastewater;

an outlet pipe through said outer chamber having an inlet end within said outer chamber for the outflow of wastewater;

a substantially spherical filter which covers said inlet end of said outlet pipe to prevent contaminants having a specific gravity near that of water from entering said outlet pipe;

a baffle which defines an inner chamber which houses the filter and the inlet end of said outlet pipe, to prevent grease and other contaminants having a specific gravity less than that of water from entering said outlet pipe.

2. A replaceable apparatus as described in claim 1, wherein said outer chamber is capable of holding between 1 and 10 gallons.

3. A replaceable apparatus as described in claim 1, wherein said lid is removable to allow the accumulated waste to be emptied from the outer chamber.

4. A replaceable apparatus as described in claim 1, wherein said lid is substantially transparent to enable the accumulation of waste in the outer chamber to be visually monitored.

5. A replaceable apparatus as described in claim 4, wherein said outer chamber is also substantially transparent to enable the accumulation of waste in the outer chamber to be visually monitored.

6. A replaceable apparatus for removing grease and other contaminants from a wastewater stream, comprising:

a closed outer chamber having a base, lid and sides;

an inlet means for delivering wastewater into the outer chamber;

an inner chamber within the outer chamber defined by a vertical baffle plate extending from the lid of the outer chamber;

an outer pipe having a substantially horizontal opening within the inner chamber and extending out of the outer chamber;

a substantially spherical filter attached to the opening of the outlet pipe for preventing waste from entering the outlet pipe.

7. A replaceable apparatus as described in claim 6, wherein said outer chamber is capable of holding between 1 and 10 gallons.

8. A replaceable apparatus as described in claim 6, wherein said lid is removable to allow the accumulated waste to be emptied from the outer chamber.

9. The replaceable apparatus of claim 1, wherein said outer chamber, inlet means, inner chamber, and the outer pipe are all plastic.

10. The replaceable apparatus of claim 1, wherein said lid is permanently affixed to said outer chamber.

\* \* \* \* \*